(12) United States Patent
Wallimann et al.

(10) Patent No.: US 7,226,947 B1
(45) Date of Patent: Jun. 5, 2007

(54) USE OF CREATINE AS A FAT SUBSTITUTE

(75) Inventors: Theo Wallimann, Kindhausen (CH); Hans Peter Pfirter, Seegräben (CH)

(73) Assignee: AlzChem Trostberg GmbH, Trostberg (DE)

(*) Notice: Subject to any disclaimer, the term of this patent is extended or adjusted under 35 U.S.C. 154(b) by 0 days.

(21) Appl. No.: 09/959,443

(22) PCT Filed: Apr. 12, 2000

(86) PCT No.: PCT/EP00/03245

§ 371 (c)(1),
(2), (4) Date: Oct. 25, 2001

(87) PCT Pub. No.: WO00/67590

PCT Pub. Date: Nov. 16, 2000

(30) Foreign Application Priority Data

May 8, 1999 (EP) .................................. 99109145

(51) Int. Cl.
*A61K 31/198* (2006.01)
*A61K 31/205* (2006.01)

(52) U.S. Cl. ........................ 514/565; 514/554; 514/556

(58) Field of Classification Search ................ 514/565, 514/554, 556, 564
See application file for complete search history.

(56) References Cited

U.S. PATENT DOCUMENTS

| | | | |
|---|---|---|---|
| 3,642,489 A * | 2/1972 | Bartley et al. ................. 426/69 |
| 3,930,018 A * | 12/1975 | Akasaki et al. ............... 424/322 |
| 3,988,483 A | 10/1976 | Deyoe et al. | |
| 4,863,748 A * | 9/1989 | Herschler ...................... 426/72 |
| 5,091,404 A * | 2/1992 | Elgebaly ...................... 514/401 |
| 5,292,523 A * | 3/1994 | Kono et al. ................... 424/520 |
| 5,516,798 A * | 5/1996 | Ferket ......................... 514/556 |
| 5,876,780 A | 3/1999 | Koivistoinen et al. | |
| 5,916,610 A * | 6/1999 | Witt et al. ...................... 426/69 |
| 5,968,544 A * | 10/1999 | Howard et al. ............... 424/439 |
| 5,973,005 A * | 10/1999 | D'Amelio et al. ........... 514/565 |
| 5,994,581 A * | 11/1999 | Fang ............................ 562/560 |
| 6,172,111 B1 * | 1/2001 | Pischel et al. ............... 514/554 |
| 6,242,490 B1 * | 6/2001 | Anelli et al. ................. 514/565 |
| 6,429,198 B1 * | 8/2002 | St. Cyr et al. ................. 514/23 |
| 6,433,015 B1 * | 8/2002 | Meyer ......................... 514/565 |
| 6,479,069 B1 * | 11/2002 | Hamilton ..................... 424/439 |
| 6,534,480 B2 * | 3/2003 | Cyr et al. ....................... 514/23 |
| 6,723,370 B2 * | 4/2004 | Ulrich et al. ................ 426/622 |
| 6,730,331 B1 * | 5/2004 | Stoll ............................ 424/728 |

FOREIGN PATENT DOCUMENTS

| | | | |
|---|---|---|---|
| DE | 198 36 450 | | 2/2000 |
| FR | 1484664 A | * | 6/1967 |
| FR | 2 561 871 | | 10/1985 |
| GB | 2 300 103 | | 10/1996 |
| WO | 98/06278 | | 2/1998 |
| WO | 99/00122 | | 11/1999 |

OTHER PUBLICATIONS

"Commonly Asked Questions about BSE in Products Regulated by FDA's Center for Food Safety and Applied Nutrition", US Food and Drug Administration, 2004.*
"NINDS Transmissible spongiform Encephalopathies Information Page", National Institute of Neurological Disorders and Stroke, 2005.*
"Dietary Supplementation of Creatine Monohydrate in Swine Finishing Diets Improves Fresh Pork Quality", Journal of Animal Science, Apr. 1999, Meeting Information.*
"4H Project Guide: Swine Nutrition", Myer et al., University of Floridan IFAS Extension, 2006.*
"Calculation of Complete Diets for Swine and Checking for Nutrition Balance", Gill et al., www.osuextra.com, 2006.*
"Swine Rations", NDSU Dickson Research Extensions Center Report, 2006.*
DATABASE WPI, Section Ch, Week 199725, Derwent Publications Ltd., London, GB; AN 1997-272800 XP002118538, May 1995
Rovee-Collier et al., Developmental Psychobiology, vol. 29, No. 3, pp. 241-272 (1996).

* cited by examiner

*Primary Examiner*—Brian Kwon
(74) *Attorney, Agent, or Firm*—Wenderoth, Lind & Ponack, L.L.P.

(57) ABSTRACT

The invention relates to the use of creatine or creatine salts as a fat substitute to be given to breeding animals and feeder animals. The creatine or creatine salts are used as a substitute for flesh meal, fish meal and/or antimicrobial performance enhancers, growth hormones as well as anabolic agents.

5 Claims, No Drawings

USE OF CREATINE AS A FAT SUBSTITUTE

This application is a 371 of PCT/EP00/03245 filed Apr. 12, 2000 which claims a benefit of EPO 99109145.5 filed May 8, 1999.

For decades, the use of meat and bonemeal, which consists of sanitized dried slaughtering waste, and also of dead animals including cattle and other ruminants, has been a general practice in feed rations for farm animals. After the occurrence of BSEs (bovine spongiform encephalopathies) in cattle, however, meat and bonemeal was banned as feed for ruminants. In pigs and other animals, comparable disease symptoms are known as TSEs (transmissible spongiform encephalopathies). Nevertheless, meat and bonemeal is considered harmless for pigs and poultry. However, the fear that these animals could be hosts and symptomless carriers of BSE- or TSE-specific structures, and the foods originating from them could have unwanted consequences on humans, had led to a widespread exclusion of meat and bonemeal from feed rations for pigs and poultry also.

However, for purely plant-based feeding, there are references according to which in the case of breeding animals and fatstock, as a result of deficiencies in constituents present in animal tissues, disadvantages must be expected.

Even in the case of usually prepared, for example boiled, slaughtering wastes and processed animal feed, the relatively low to absent creatine content, compared with fresh meat, is disadvantageous. In particular in the case of canned food, for example for cats and dogs, cooking the ingredients during food manufacture destroys the creatine content present in the fresh meat.

Creatine is a substance which has been known for more than a hundred years which is endogenous both in humans and animals, and is partly synthesized by the body itself or is taken up via the diet.

The importance of creatine in metabolism is at a cellular level, in that it forms a short-term energy reserve and participates in energy transport (Wallimann et al., Biochem. J. 281, 21–40, 1992). The intake of creatine, in humans, leads to improved muscle performance with appropriate training. In the case of dogs also, in particular racing dogs, hunting dogs, etc., this effect has already been observed, as is described, for instance, in GB 2 300 103.

In addition, fewer and fewer antimicrobial growth promoters ("antibiotics") are being added as a feed additive to the feed of breeding animals and fatstock, but because of their absence in addition a greater sensitization of the animals to stresses of the digestive tract and the immune system are occurring.

Unexpectedly, it has now been found that not only does creatine lead to improved muscle performance in humans and animals, but the use of creatine in farm animals, in particular hens, pigs and salmon, can improve the performance of the animals, especially in the absence of feedstuffs of animal origin, such as meat and bonemeal or fishmeal.

The invention therefore relates to the use of creatine or creatine salts as feed additive for breeding animals and fatstock as a substitute for meat and bonemeal, fishmeal and/or antimicrobial growth promoters, growth hormones and anabolics.

Creatine is a substance which has long been known (The Merck Index, Eleventh Edition, No. 2570, 1989) and is commercially available or can easily be synthesized, for example, as described in Ullmann's Encyclopedia of Industrial Chemistry, 5th edition, volume A 12, 552, VCH-Verlagsgesellschaft, Weinheim (1987) or in U.S. Pat. No. 2,654,779 by reacting cyanamide with sarcosine.

Other preparation variants are disclosed, for example, by EP-A-0754 679, which describes the reaction of cyanamide with sarcosinate.

The term creatine thus comprises the isolated form of naturally occurring creatine and chemically synthesized forms.

Creatine can be used as such or in the form of a salt. Suitable salts are, for example, creatine pyruvates of the general formula $(creatine)_x(pyruvate)_y(H_2O)_n$, where $x=1$ to 100, $y=1$ to 10 and $n=0$ to 10, which are described in WO 98/28263. Other suitable salts are the creatine salts disclosed by EP-A-0775 108, that is to say creatine citrate, creatine maleate, creatine fumarate, creatine tartrate or creatine malate, or the creatine ascorbates described in WO 98/38183 of the formula $(creatine)_x(ascorbate)_y(H_2O)_n$, where $x=1$ to 100, $y=1$ to 100 and $n=0$ to 20. Other suitable salts for the inventive use are also, for instance, creatine phosphorenolpyruvate, creatine succinates, creatine formates and creatine gluconates, potassium creatine, calcium creatine or sodium creatine, or creatine phosphate which is commercially available. In addition, cyclocreatine and other creatine analogs known from the literature also come into consideration. Mixtures of creatine with one or more of the abovementioned salts or mixtures of one or more of the abovementioned salts can also be used.

Creatine or its salts are used in animal feed as feed additive for the most varied animals and are thus used for the most varied types of feed.

The invention therefore also relates to the use of creatine or creatine salts as feed additive in predominantly plant-origin feed as a substitute for meat and bonemeal or fishmeal and/or antimicrobial growth promoters for improving meat quality, improving weight gain and percent muscle meat, improving the lean body mass index and embryo development, for increasing fertility of the mother animals, male fertility and survival rate of young animals, increasing the laying performance in poultry and lowering the infection rate. By using creatine as a feed additive, in poultry species, such as hens, ducks, geese and turkeys, a higher growth rate at the weight with decreased feed expenditure is achieved, in which case the time in which the corresponding increase in weight is achieved is reduced in comparison with previously used feeding methods using meat and bonemeal and antimicrobial growth promoters. The increase in growth is produced here by an increased percent protein ("increase in meat") and not by increased fattening of the animals, which produces an improvement in the lean body mass index. In addition, the addition of creatine makes the addition of growth hormones, other growth factors or hormones or of hormone-like substances and also anabolics, which have previously been used to achieve an improved increase in meat, superfluous.

Other advantages in poultry feed supplementation by creatine or its salts are increased egg laying performance of the hens, increase in fertility and in sperm production and sperm quality of the cocks, and a decreased infection rate due to an improved immune system.

The invention therefore relates to the use of creatine or creatine salts as feed additive for poultry as a substitute for meat and bonemeal and/or antimicrobial growth promoters for increasing meat quality, improving weight gain and percent muscle meat, improving the lean body mass index, for increasing egg laying performance of the hens, for increasing sperm production and sperm quality of the cocks and for lowering the infection rate.

In the case of pigs, the use of meat and bonemeal in feeding can also be entirely dispensed with. Secondly, the addition of antimicrobial growth promoters, such as antibiotics, can also be avoided, since creatine also has growth-promoting properties in pigs. In addition, the inventive use of creatine or creatine salts achieves improved fertility of the female animals, which is shown in an increase in cycles on heat and receptivity to pregnancy, as a result of which, inter alia, the number of piglets per litter is increased. Other advantages are improved embryo development by feeding the mother animals with creatine or creatine salts, improved spermatogenesis in male breeding animals, and improved weight gain. The survival rates and thriving of the piglets during lactation as a result of creatine uptake via the milk from the mother animal which is optimally supplied by creatine-supplemented feed and later by creatine supplementation of the young animals are increased. In addition, decrease in infection rate is achieved by an improved immune system.

The invention therefore also relates to the use of creatine or creatine salts as feed additive for pigs as substitute for meat and bonemeal and/or anti-microbial growth promoters for improving meat quality, improving weight gain and percent muscle meat, improving the lean body mass index and embryo development, increasing the fertility of the mother animals and survival rate of the young animals, improving spermatogenesis, and lowering the infection rate.

In the case of breeding salmon, by using creatine or creatine salts as feed additive, feeding can be performed on a predominantly plant-origin basis, as a result of which the consumption of fish meal, which is generally produced from small Pacific fish is substantially decreased. A further advantage is lowering the infection rates due to an improved immune system.

The invention therefore further relates to the use of creatine or creatine salts as feed additive for breeding salmon as substitute for fishmeal and/or antimicrobial growth promoters.

Creatine or creatine salts can, however, also be added to the powdered milk replacer for growing calves, as a result of which milk constituents can be economized and an improved weight gain, improved meat quality, increase in lean body mass and a reduction in the fat content of the calves is achieved, and also a lowering of the infection rate due to an improved immune system and improved feed utilization.

The use of creatine or creatine salts as additive for powdered milk replacer for growing calves to improve the weight gain, to improve meat quality, to increase the lean body mass and to reduce the fat content of the calves, and to lower the infection rate and improve feed utilization is thus also a subject-matter of the invention.

A further possible use of creatine and creatine salts as feed additive is wet or canned food for dogs and cats, in which in the production process the creatine content originally present in the starting material is reduced.

In this case, firstly lowering of the infection rate due to an improved immune system is again achieved, and, in addition to the fact that the animals are livelier and stronger, the animals secondly have a significantly glossier coat.

Creatine or its salts can thus be added to the most varied types of feed. The following types of feed are suitable for the inventive addition: Feed meal administered dry or wet, pelleted feed, expanded feed, extruded feed, feed flakes, powdered milk replacement, wet or canned food.

Creatine or its salts are added as dietary supplements to the feed mixture during production, that is to say before filling and packing in cans etc. Another possibility is the addition after expansion or extrusion of the feed, and in pellet production. Creatine is added either in powdered form or in the case of water-soluble salts in the form of an aqueous solution.

The amount of creatine added to the feed preferably corresponds to the amount determined in dose-effect experiments or the amount determined on the basis of the creatine content present in fresh meat. If appropriate, twice to four times the amount can also be added.

The amounts of added creatine are dependent here on the animals to be fed, so that they can then be within a broad range. Preferred amounts of creatine are in the range of 1 to 50 g/kg, particularly preferably from 1 to 5 g/kg of air-dry feed. The amount of feed administered should in this case preferably ensure a supply with 0.2 to 0.5 g of creatine per kg of metabolic body weight ($G^{0.75}$).

Creatine and its salts can if appropriate be added together with customary feed additives, such as fats, amino acids, minerals, trace elements, vitamins and flavorings.

EXAMPLE 1

The effect of addition of creatine in the feed for growing hens was studied.

It was found here that by adding 0.2% creatine (0.2 g/kg) to the air-dried feed for a growing period of 41 days, an increase in the final weight of 4% compared with previous feeding methods (without creatine addition) was achieved. This increase in weight was achieved only by increase in meat, but not by increase in fat (improvement of lean body mass index), in which case the meat also had an improved quality.

The feed consumption decreased here by about 2–3% in comparison with previous feeding methods.

The invention claimed is:

1. A method of improving meat quality of breeding animals or fatstock which consists of feeding them with a feed composition consisting of a plant origin feed and, as an additive, creatine per se or salts thereof, in an amount of 0.2 to 0.5 grams of creatine per kilogram of metabolic body weight, wherein said breeding animals or fatstock are poultry, cattle or pigs.

2. The method according to claim 1 wherein said additive is a creatine salt which is creatine pyruvate of the formula (creatine)$_x$(pyruvate)$_y$(H$_2$O)$_n$, where x=1 to 100, y=1 to 10 and n=0 to 10, creatine citrate, creatine maleate, creatine fumarate, creatine tartrate, creatine malate, creatine ascorbate of the formula (creatine)$_x$(ascorbate)$_y$(H$_2$O)$_n$, where x=1 to 100, y=1 to 100 and n=0 to 20, creatine phosphorenolpyruvate, creatine succinate, creatine formate and creatine gluconate, potassium creatine, calcium creatine, sodium creatine, creatine phosphate or cyclocreatine or mixtures thereof.

3. The method according to claim 1 wherein the breeding animals or fatstock being fed are cattle.

4. The method according to claim 1 wherein the breeding animals or fatstock being fed are poultry.

5. The method according to claim 1 wherein said feed to which creatine is added has been air dried.

* * * * *